United States Patent
Schaefer et al.

[19]

[11] Patent Number: 5,975,480
[45] Date of Patent: Nov. 2, 1999

[54] MOTOR MOUNT

[75] Inventors: William Schaefer, Andover; Michael Dietsch, Blaine, both of Minn.

[73] Assignee: Millennium Technologies, Inc., Minneapolis, Minn.

[21] Appl. No.: 08/911,566

[22] Filed: Aug. 14, 1997

[51] Int. Cl.⁶ .................................................. F16M 1/00
[52] U.S. Cl. .......................... 248/678; 248/651; 248/657
[58] Field of Search ................................... 248/678, 680, 248/670, 637, 671, 657, 346.01, 500, 346.06, 188.1, 346.07; 108/143

[56] References Cited

U.S. PATENT DOCUMENTS

| | | | |
|---|---|---|---|
| 1,194,915 | 8/1916 | Woolery | 248/646 |
| 1,211,352 | 1/1917 | Rathburn | 248/657 |
| 1,453,416 | 5/1923 | Stanley | 417/359 |
| 1,511,336 | 10/1924 | Hoey | 248/656 |
| 1,974,158 | 9/1934 | Okenfuss | 248/651 |
| 2,047,838 | 7/1936 | Smith et al. | 175/264 |
| 2,376,280 | 5/1945 | Schonert et al. | 151/41 |
| 2,538,276 | 1/1951 | Shoffner | 74/16 |
| 2,765,997 | 10/1956 | Motts | 248/657 |
| 2,904,287 | 9/1959 | Ertsgaard et al. | 248/25 |
| 3,066,898 | 12/1962 | Haynes | 248/656 |
| 3,652,044 | 3/1972 | Manross | 248/651 |
| 3,934,829 | 1/1976 | Coucher | 241/259.1 |
| 4,012,021 | 3/1977 | Duceppe | 248/23 |
| 4,433,824 | 2/1984 | Koosha | 248/662 |
| 4,638,971 | 1/1987 | Basinsky et al. | 248/678 |
| 4,700,923 | 10/1987 | Lewis, Jr. et al. | 248/679 |
| 4,739,206 | 4/1988 | Sieber | 310/91 |
| 5,024,002 | 6/1991 | Possati | 33/549 |
| 5,085,396 | 2/1992 | Mansson | 248/678 |
| 5,149,050 | 9/1992 | Smith et al. | 248/679 |
| 5,277,395 | 1/1994 | Smith et al. | 248/679 |
| 5,292,096 | 3/1994 | Bodenheimer | 248/228 |
| 5,526,708 | 6/1996 | Hill | 74/16 |

OTHER PUBLICATIONS

Catalog Sheet entitled "Adjustable Motor Bases", p. 55, published prior to Aug. 14, 1997.

*Primary Examiner*—Leslie A. Braun
*Assistant Examiner*—Anita M. King
*Attorney, Agent, or Firm*—Crompton, Seager & Tufte, LLC

[57] ABSTRACT

A motor mount for a motor having an elongate drive shaft. The motor mount includes a base having a generally planar surface. At least one elongate rail is disposed at the surface of the base. A motor carriage plate has a generally planar bottom surface disposed approximate to and generally parallel to the surface of the base. The motor carriage plate has at least one rail engaging surface disposed at an angle to the bottom surface. The motor mount includes a motor carriage fastener for fastening the motor to the motor carriage plate. A fastener is provided for attaching the motor carriage plate to the base plate such that the rail engaging surface engages the elongate rail.

4 Claims, 5 Drawing Sheets

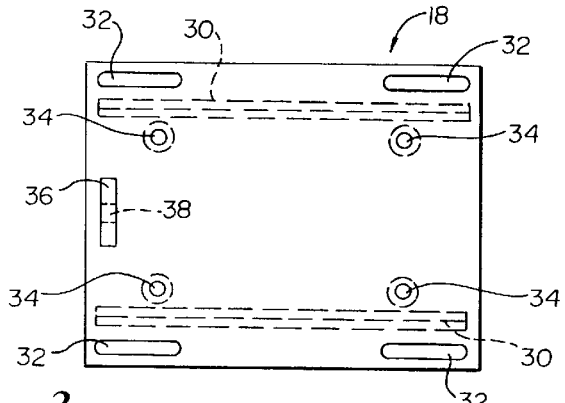
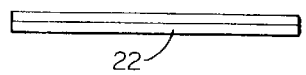
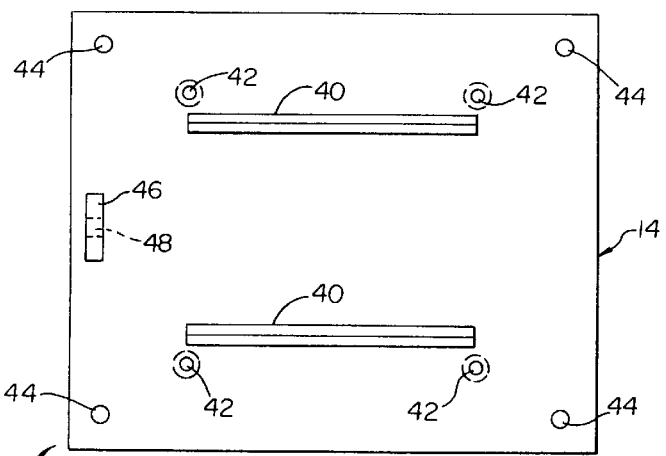
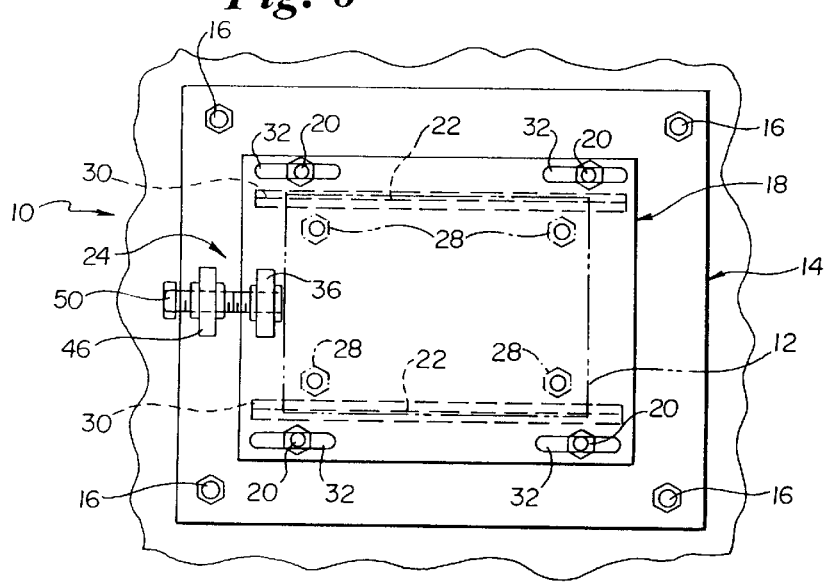

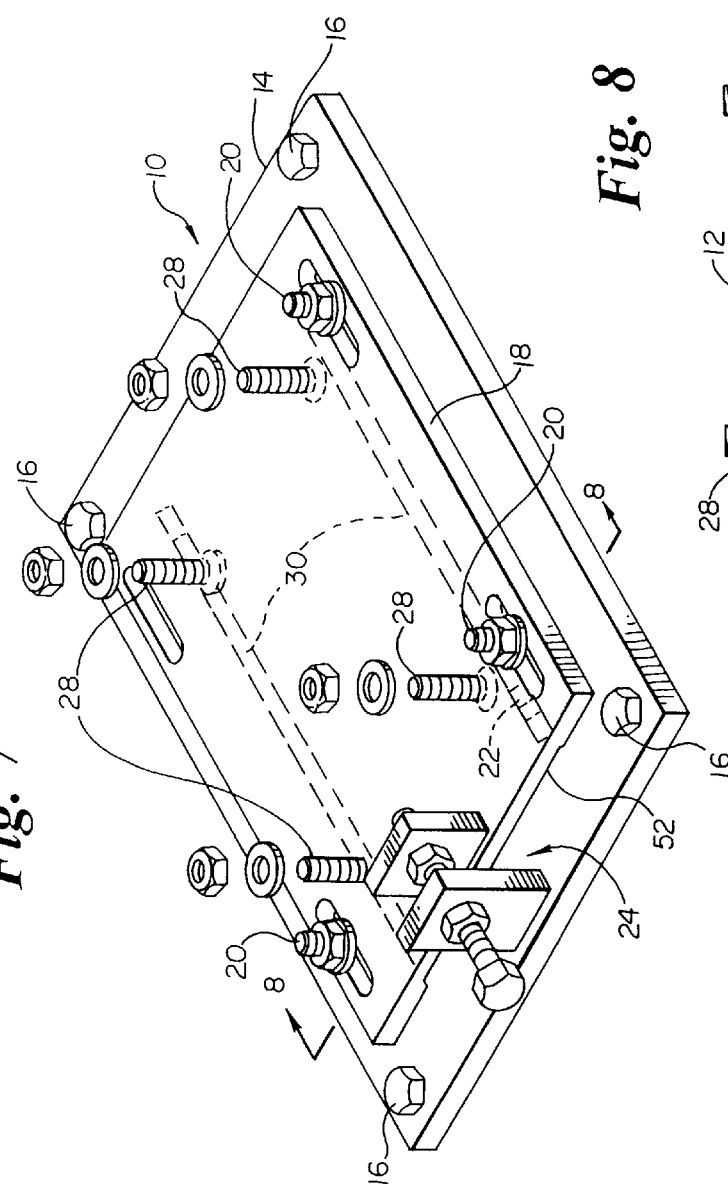
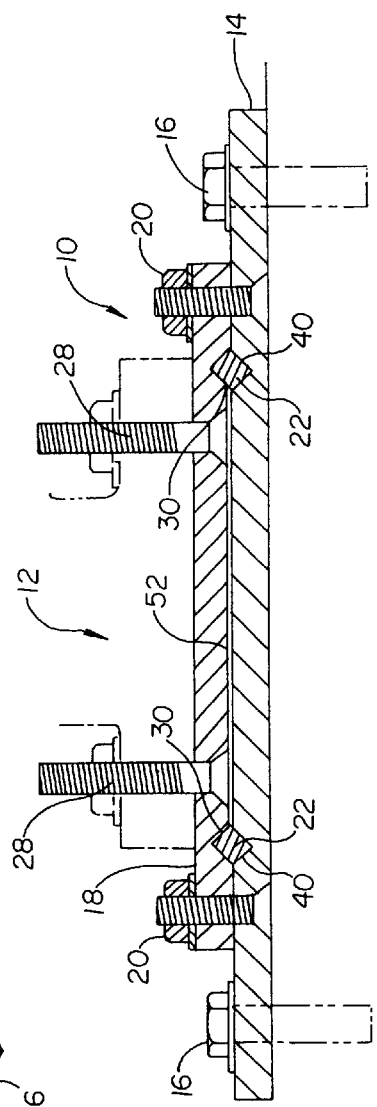
Fig. 7
Fig. 8

MOTOR MOUNT

BACKGROUND OF THE INVENTION

The present invention pertains generally to the field of motor mounts and, in particular, to motor mounts for precision alignment of motors.

Motors, and in particular, electric motors, are widely used in industrial applications to drive fans, conveyer belts and other devices. Power is generally transferred from the electric motor by belts and/or couplings. In a simplified application, a pulley is connected to the motor drive shaft, a belt fitted to the pulley transfers energy from the drive shaft as the pulley rotates. The belt can be fitted to a second pulley which is, for example, connected to a fan.

Ideally, the pulley fitted to the drive shaft and the pulley fitted to the fan are precisely aligned such that the belt is centered within the respective grooves of the pulleys without being biased toward one or the other side of the grooves. If the belt is biased into the sides of the pulleys due to improper alignment of the pulleys, chafing of the belt can occur. If excessive chafing occurs, the life of the belt can be reduced as well as the efficiency of the power transfer between the two pulleys.

In industrial applications, each time a belt fails, a manufacturing facility may experience a costly shut down of an assembly line if, for example, the power to a conveyer belt is cut. If the belt is then replaced and the pulleys remain improperly aligned, accelerated failure of the belts can be anticipated. When using prior motor mounts, precise alignment of the pulleys after belt replacement would require the use of precision measuring devices used by skilled technicians who may not be readily available to realign the motor. Thus, in order to restart the assembly line, the belt may be replaced without proper realignment. Consequently, accelerated belt failures and assembly line shut downs will continue.

SUMMARY OF THE INVENTION

The present invention pertains to an improve motor mount for reliably aligning the drive shaft of a motor for efficient power transfer by belt and pulleys, couplings or the like. The present invention provides for repeatable accurate alignment of the motor even after a belt has failed and been replaced. Precision tools and skilled technicians are generally not required to realign the pulleys after belt replacement.

In one embodiment of the present invention, a motor mount is provided for a motor having an elongate drive shaft. The motor mount includes a base. At least one elongate rail is disposed on the base. The mount includes a motor carriage having at least one rail engaging surface. A carriage fastener attaches the motor to the motor carriage. Another fastener attaches the motor carriage to the base such that the rail engaging surface engages the elongate rail.

In an alternate embodiment, the rail is operably connected to the motor carriage. The base includes at least one rail engaging surface. The carriage fastener attaches the motor carriage to the base such that the rail engaging surface engages the elongate rail.

In yet another embodiment of the motor mount in accordance with the present invention, the motor mount includes a base having a generally planar surface. At least one elongate rail is disposed at the surface of the base. A motor carriage plate which has a generally planar bottom surface is disposed proximate to and generally parallel to the surface of the base. The motor carriage plate has at least one rail engaging surface disposed at angle of greater than 0° to the bottom surface.

The motor mount includes a motor carriage fastener for fastening the motor to the motor carriage plate. Another fastener is provided for attaching the motor carriage plate to the base plate such that the rail engaging surface engages the elongate rail.

The motor carriage plate can define one or more elongate channel(s) including at least two sides for engaging the rail (s). The channel can be longer than the rail to allow the motor carriage plate to slide on the rail.

The motor carriage fastener can be configured to retain the motor on the motor carriage plate such that the elongate rail is generally perpendicular or, in the alternative, generally parallel to the drive shaft. The drive shaft would be placed perpendicularly to the rail when a pulley and belt power take-off is used. When a drive shaft coupling is used, the drive shaft can be placed parallel to the rails.

BRIEF DESCRIPTION OF THE DRAWINGS

FIG. 2 is a top view of a motor carriage plate;

FIG. 3 is a side view of a rail;

FIG. 4 is an end view of the rail of FIG. 3;

FIG. 5 is a top view of a base plate;

FIG. 6 is a top view of an assembled motor mount;

FIG. 7 is a perspective view of the motor mount;

FIG. 8 is a cross sectional view of the motor mount taken from FIG. 7;

DETAILED DESCRIPTION OF THE INVENTION

Figure 1:
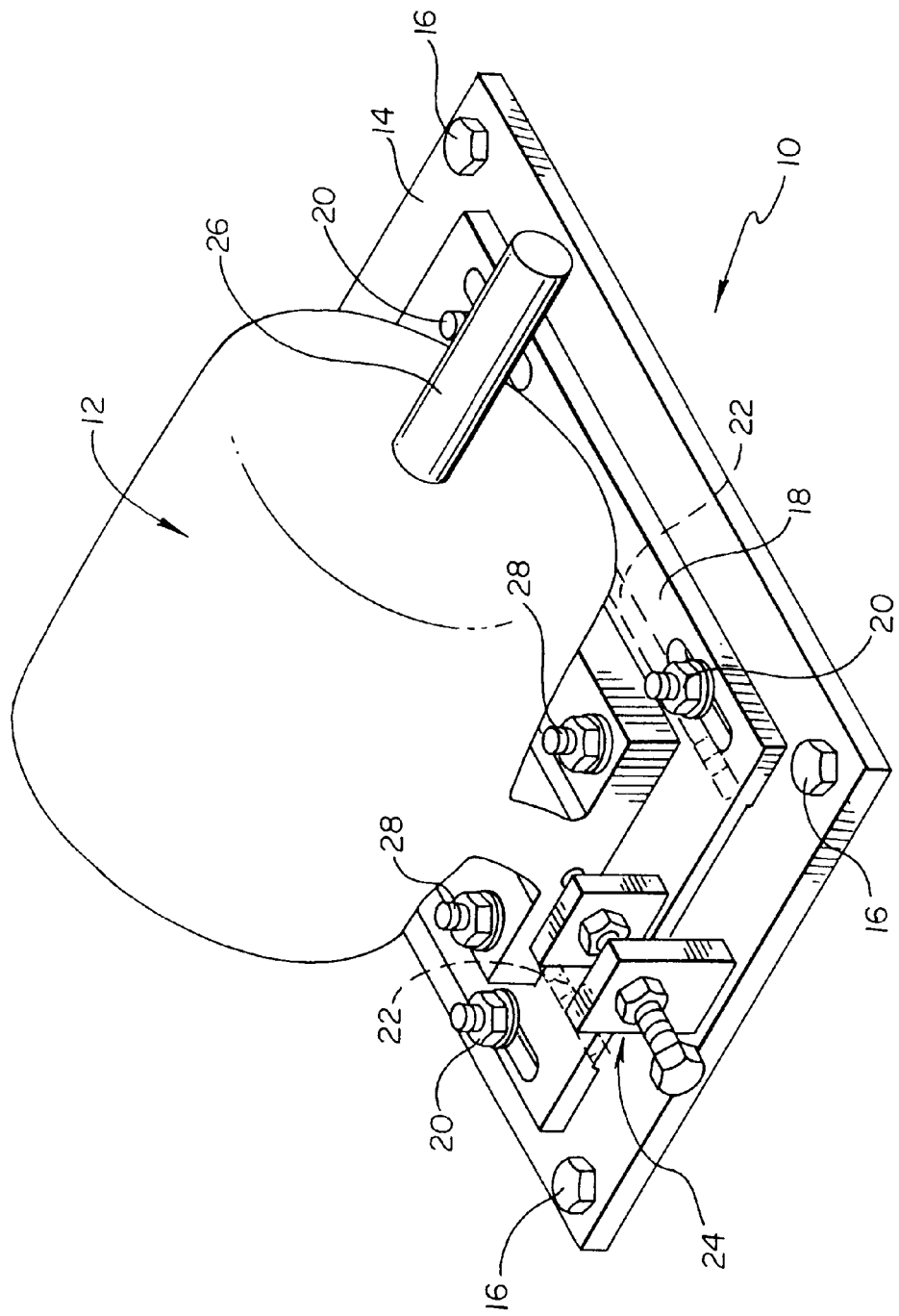
FIG. 1 is a perspective view of a motor mount in accordance with the present invention and an electric motor mounted thereon.

Referring now to the drawings where like reference numerals refer to like elements throughout the several views, FIG. 1 is a perspective view of a motor mount 10 in accordance with the present invention. A typical electric motor 12 is shown on mount 10. Motor mount 10 includes a base 14. Base 14 can preferably be connected to a foundation such as a concrete slab or truss (not shown), by fasteners 16 (shown as hex head bolts). Motor mount 10 includes motor carriage 18. Carriage 18 which is disposed on base 14, can be connected to base 14 by carriage fasteners 20 (shown here as hex nuts and bolts). Disposed between motor carriage 18 and base 14 are rails 22. An adjustment mechanism 24 is provided to shift carriage 18, with respect to base 14, and parallel to rails 22. A typical motor 12 preferably includes an elongated drive shaft 26. Motor 12 can be mounted to motor carriage 18 by fasteners 28 (shown here as hex head nuts and bolts).

FIG. 2 is a top view of motor carriage 18. Motor carriage 18 can be formed from a metallic plate or other sufficiently durable material. As shown in FIG. 2, motor carriage 18 can include two elongate channels 30 for receiving rails 22. Channels 30 are preferably longer than rails 22. Elongate apertures 32 are formed in carriage 18 to receive the bolt portion of carriage fasteners 20. Apertures 34 can be formed in motor carriage 18 to receive the bolt portion of motor fasteners 28. Apertures 34 as shown here are countersunk from below and arrange in a standard motor mount pattern. Motor carriage 18 also includes a portion 36 of adjustment mechanism 24. Portion 36 can be formed from a metal plate disposed perpendicularly to carriage 18. An aperture 38 can be defined through portion 36.

FIG. 3 shows a side view of rail 22 in accordance with the present invention. FIG. 4 is an end view of rail 22. Rail 22 can be formed from a metal or other sufficiently durable material to withstand the stresses experienced during normal use.

FIG. 5 is a top view of base 14 including channels 40 for receiving rails 22. Channels 40 are preferably approximately the same length as rails 22. It should be appreciated that rails 22 can be separately formed and placed into or fastened in channels 40. Alternately, rails 22 could be placed in or fastened in channels 30 of motor carriage 18. If rail 22 is fastened to motor carriage 18 it preferably is not attached to base 14. The length of the channels into which rail 22 is not fastened is preferably longer than rail 22 to allow for sliding within the longer channel.

Base 14 also include apertures 42 countersunk from below to receive the bolt portion of carriage fasteners 20. Base 14 also defines apertures 44 for receiving base fasteners 16. A portion 46 of rail adjustment mechanism 24 includes a plate disposed perpendicularly to base 14 and has an aperture 48 defined therethrough. Base 14 can be formed from a metallic plate or other sufficiently durable material.

FIG. 6 is a top view of motor mount 10. Motor carriage 18 is disposed on base 14. Rails 22 are disposed between base 14 and motor carriage 18 in channels 30 and 40. Adjustment mechanism 24 includes a bolt 50 extending through portions 36 and 46. Nuts can be disposed on bolt 50 and adjusted longitudinally to shift carriage 18 relative to base 14 on rails 22.

FIG. 7 is a perspective view of motor mount 10 without motor 12 disposed thereon. FIG. 8 is a transverse cross sectional view of motor mount 10 taken from FIG. 7 (motor 12, however, is shown in phantom line). In FIGS. 7 and 8, a recess 52 can be seen in the bottom of motor carriage 18. Recess 52 reduces the surface area of motor carriage 18 in contact with base 14, thereby reducing the sliding friction between base 14 and carriage 18.

Figure 9:
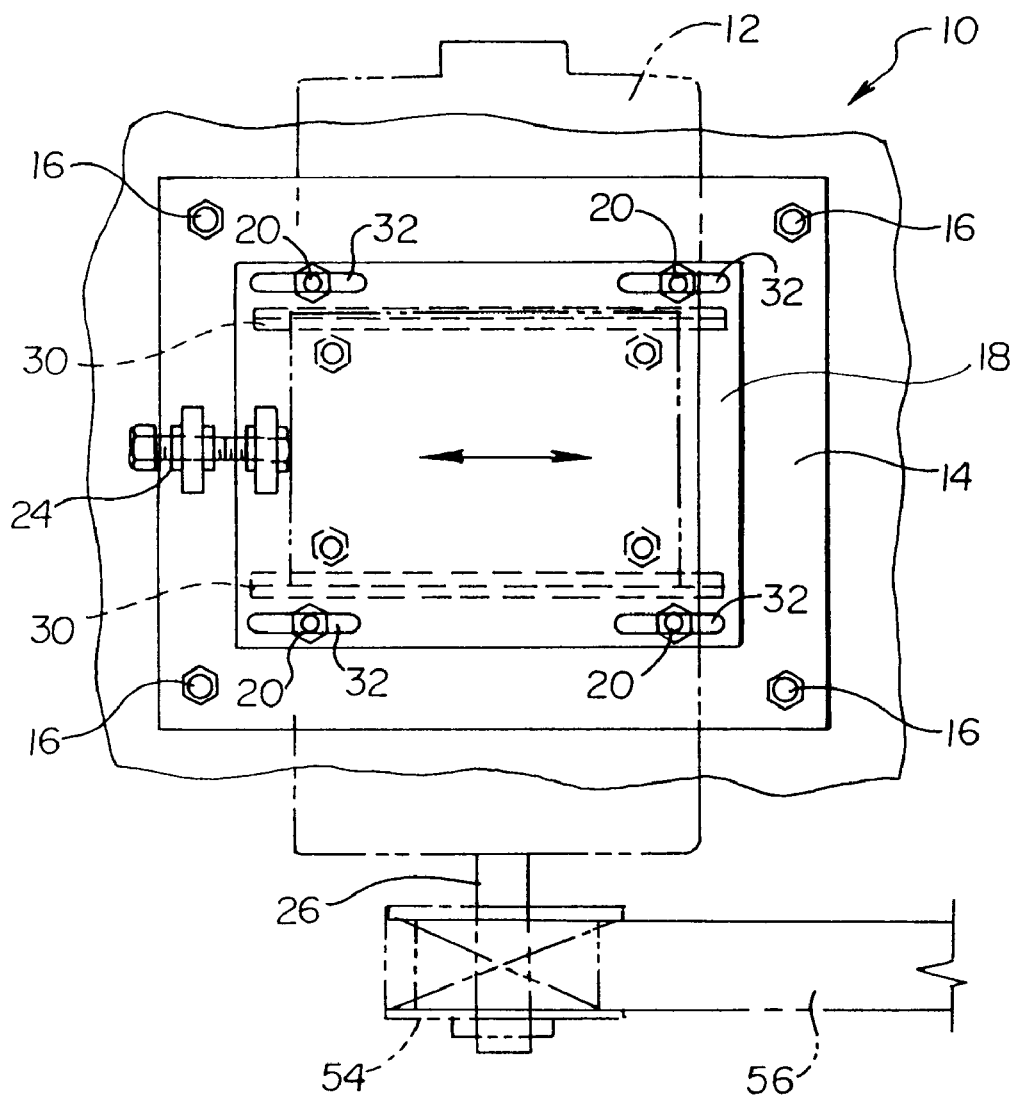
FIG. 9 is a top view of the motor mount showing the motor disposed thereon for a coaxially coupled powered take-off.

FIG. 9 is a top view of motor mount 10 having a motor 12 disposed thereon. A pulley 54 is connected to drive shaft 26 and to a drive belt 56. Belt 56 can be connected to a second or additional pulleys which are in turn connected to various devices such as fans or conveyer belts. When motor mount 10 is originally installed, channels 30 and 40 and rails 22 are aligned perpendicularly to drive shaft 26. Preferably, pulley 54 and belt 56 will be aligned perpendicularly to shaft 26. The additional pulley or pulleys to which belt 56 is connected will likewise be disposed perpendicularly to drive shaft 26. The pulley(s) are preferably transversely aligned with pulley 54 such that belt 56 is not biased toward one side of pulley 54 or the other.

Biasing belt 56 toward one side of pulley 54 or the other could increase friction between the pulley and the belt and thus increase wear of the belt and decrease the efficiency of the power take off from motor 12. In order to accomplish the precise alignment of the respective pulleys, motor mount 10 must be carefully placed such that pulley 54 is placed in the proper alignment relative to the other pulley(s) to which belt 56 is connected.

It can be appreciated that if rails 22 are precisely perpendicular to drive shaft 26, and parallel to the pulleys, belt 56 can be replaced and proper alignment of the pulleys maintained without realigning base 10. To accomplish this, carriage fasteners 20 are loosened allowing carriage 18 to slide on rails 22 as shown by the arrow. The bolt portions of fasteners 20 will slide in elongate apertures 32. A new belt 56 can be placed on pulley 54 by first shifting motor carriage 18 and motor 12 to the right to shorten the distance between the respective pulleys. Subsequently, carriage 18 along with motor 12 are shifted to the left to tighten belt 56. Carriage 18 is maintained in this position by tightening fasteners 20.

Figure 10:
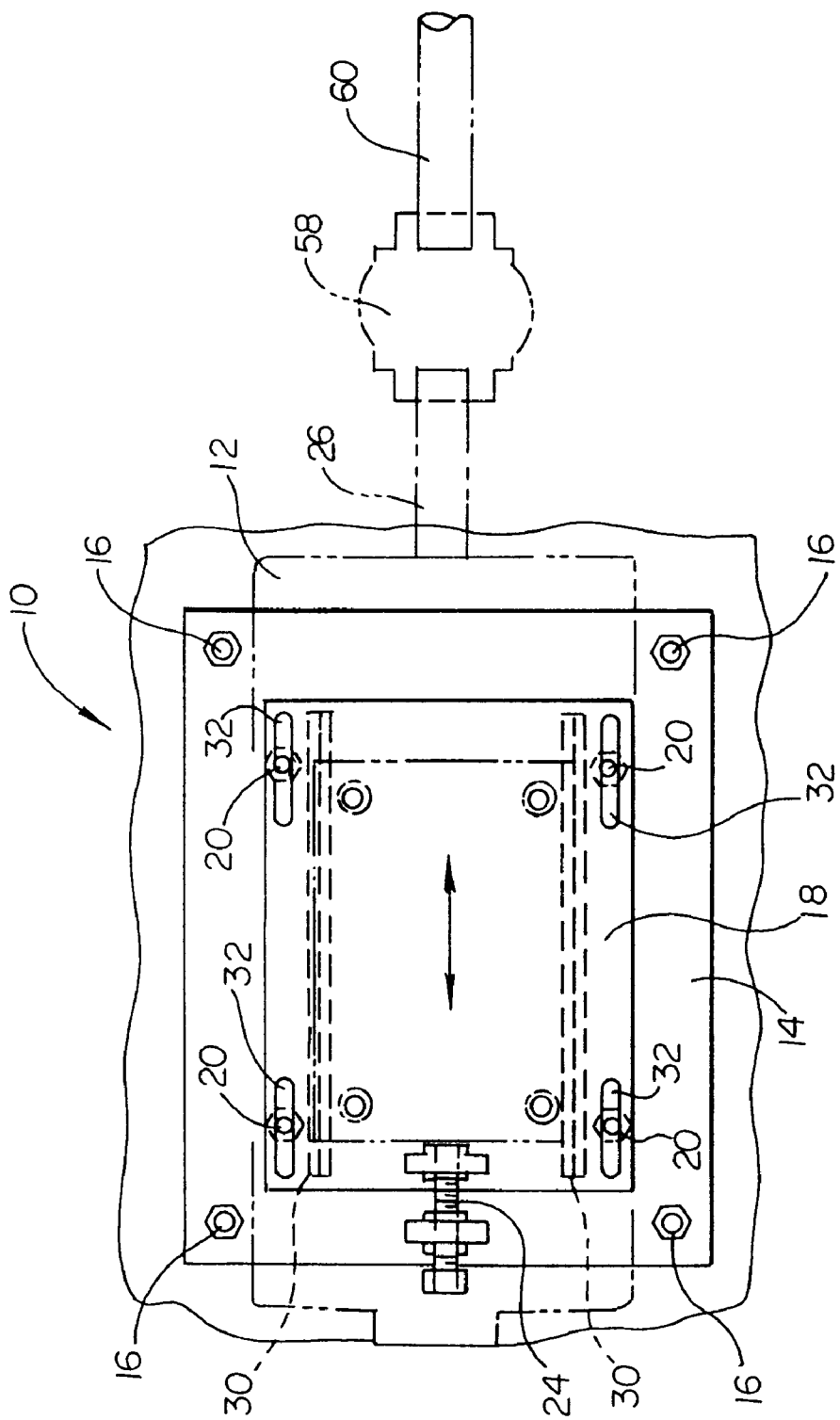
FIG. 10 is a top view of the motor mount showing the motor disposed thereon for a coaxially coupled pulley and belt powered take-off.

FIG. 10 is a top view of motor mount 10 showing motor 12 in phantom and mounted such that drive shaft 26 is parallel to rails 22 and channels 30 and 40. Drive shaft 26 is shown coaxially aligned with a second shaft 60. A coupling 58 connects drive shaft 26 to shaft 60. Initially, motor mount 10 is carefully aligned such that drive shaft 26 is coaxially aligned with shaft 60. Should motor 12 need to be de-coupled from drive shaft 60 for maintenance or the like, carriage fasteners 20 can be loosened such that carriage 18 can be slid to the left, as shown by arrow, to remove shaft 26 from coupling 58. Drive shaft 26 can be re-positioned in coupling 58 by shifting motor carriage 10 to the right. Motor carriage 10 can be retained in this position by tightening carriage fasteners 20.

Thus, it can be appreciated that motor mount 10 will initially have to be carefully aligned. The initial alignment may require precision tools and special skills known to those skilled in this field. Once this alignment has been done, however, realignment after belt replacement, motor maintenance and the like, typically will not involve this type of effort.

In addition to mounting a motor on mount 10, it is contemplated that a C-face motor could be mounted on mount 10 if mount 10 were modified to include an aligned opening through base 14 and carriage 18. This way the drive shaft of the C-face motor would extend through motor mount 10, it being well known to those skilled in this field that a C-face motor is mounted on its end proximate the drive shaft. It is further contemplated that rather than mounting the motor directly onto motor carriage 18 as shown in FIGS. 9 and 10, a gear box, such as a speed reducing gear box can be mounted directly onto motor carriage 18. The motor is then in turn mounted on the gear box as known to those skilled in this field. When the gear box is mounted onto the motor mount, it can be appreciated that the drive shaft exiting the gear box would be aligned as described above with respect to the motor drive shaft.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The inventions's scope is, of course, defined in the language in which the appended claims are expressed.

What is claimed is:

1. A motor mount for a motor having an elongate drive shaft, the motor mount comprising:
   a motor carriage having at least one elongate channel, the elongate channel including at least two sides, at least one of the sides including a rail engaging surface;
   at least one elongate rail;
   a base having at least one elongate channel, the elongate channel including at least two sides, at least one of the sides including a rail engaging surface;
   a carriage fastener for attaching the motor to the motor carriage; and a fastener for attaching the motor carriage to the base such that the rail engaging surfaces engage the elongate rail, the at least one elongate rail being substantially enclosed by the elongate channel of the motor carriage and the elongate channel of the base.

2. A method of mounting a device, including a power transfer mechanism, having an elongated drive shaft, comprising the steps of:

prov016ing a power transfer mount including a carriage having at least one elongate channel including at least one rail engaging surface, at least one elongate rail, a base having at least one elongate channel including at least one rail engaging surface, at least one carriage fastener for attaching the device to the carriage, a fastener for attaching the carriage to the base such that the rail engaging surfaces engage the at least one elongate rail, the at least one elongate rail being substantially enclosed by the elongate channel of the carriage and the elongate channel of the base;

fastening the device to the carriage with the carriage fastener so that the longitudinal axis of the elongated shaft is perpendicular to the at least one rail; and fixing the carriage to the base with the fastener.

3. A method of mounting a device, including a power transfer mechanism, having an elongated drive shaft, comprising the steps of:

providing a power transfer mount including a carriage having at least one elongate channel including at least one rail engaging surface, at least one elongate rail, a base having at least one elongate channel including at least one rail engaging surface, at least one carriage fastener for attaching the device to the carriage, a fastener for attaching the carriage to the base such that the rail engaging surfaces engage the at least one elongate rail, the at least one elongate rail being substantially enclosed by the elongate channel of the carriage and the elongate channel of the base;

fastening the device to the carriage with the carriage fastener so that the longitudinal axis of the elongated shaft is parallel to the at least one rail; and fixing the carriage to the base with the fastener 4. A method of replacing an old power transmission device with a new power transmission device, comprising the steps of:

providing a first power transfer mechanism including an elongated shaft and a power transmission coupling;

providing a second power transfer mechanism including an elongated shaft and a power transmission coupling;

the old power transmission device being coupled to the power transmission coupling of the first power transfer mechanism, and the power transmission coupling of the second power transfer mechanism;

a carriage having at least one elongate channel including at least one rail engaging surface;

the first power transfer mechanism being attached to the carriage by at least one carriage fastener;

at least one elongate rail;

a base having at least one elongate channel including at least one rail engaging surface;

the base being positioned so that the at least one elongate channel is aligned with the power transmission coupling of the second power transfer mechanism;

a fastener for attaching the carriage to the base such that the rail engaging surfaces engage the at least one elongate rail;

the at least one elongate rail being substantially enclosed by the elongate channel of the carriage and the elongate channel of the base;

an adjustment bolt to shift the carriage with respect the base;

loosening the fastener attaching the carriage to the base;

rotating the adjustment bolt so that the carriage moves to decouple the power transmission coupling of the first power transfer mechanism from the old power transmission device;

removing the old power transmission device;

placing the new power transmission device in the position vacated by the old power transmission device;

rotating the adjustment bolt to couple the new power transmission device to the power transmission coupling of the first power transfer mechanism and the power transmission coupling of the second power transfer mechanism; and fixing the carriage to the base with the fastener.

* * * * *